Nov. 6, 1923.                     1,473,299
J. W. KOHLHEPP
HOG DEHAIRING MACHINE
Filed July 28, 1922         5 Sheets-Sheet 1

Nov. 6, 1923.

J. W. KOHLHEPP 1,473,299

HOG DEHAIRING MACHINE

Filed July 28, 1922   5 Sheets-Sheet 4

Witnesses
M. Clifford
Carlton L. Hee

Inventor
John W Kohlhepp
Charles W Fill
by   Atty

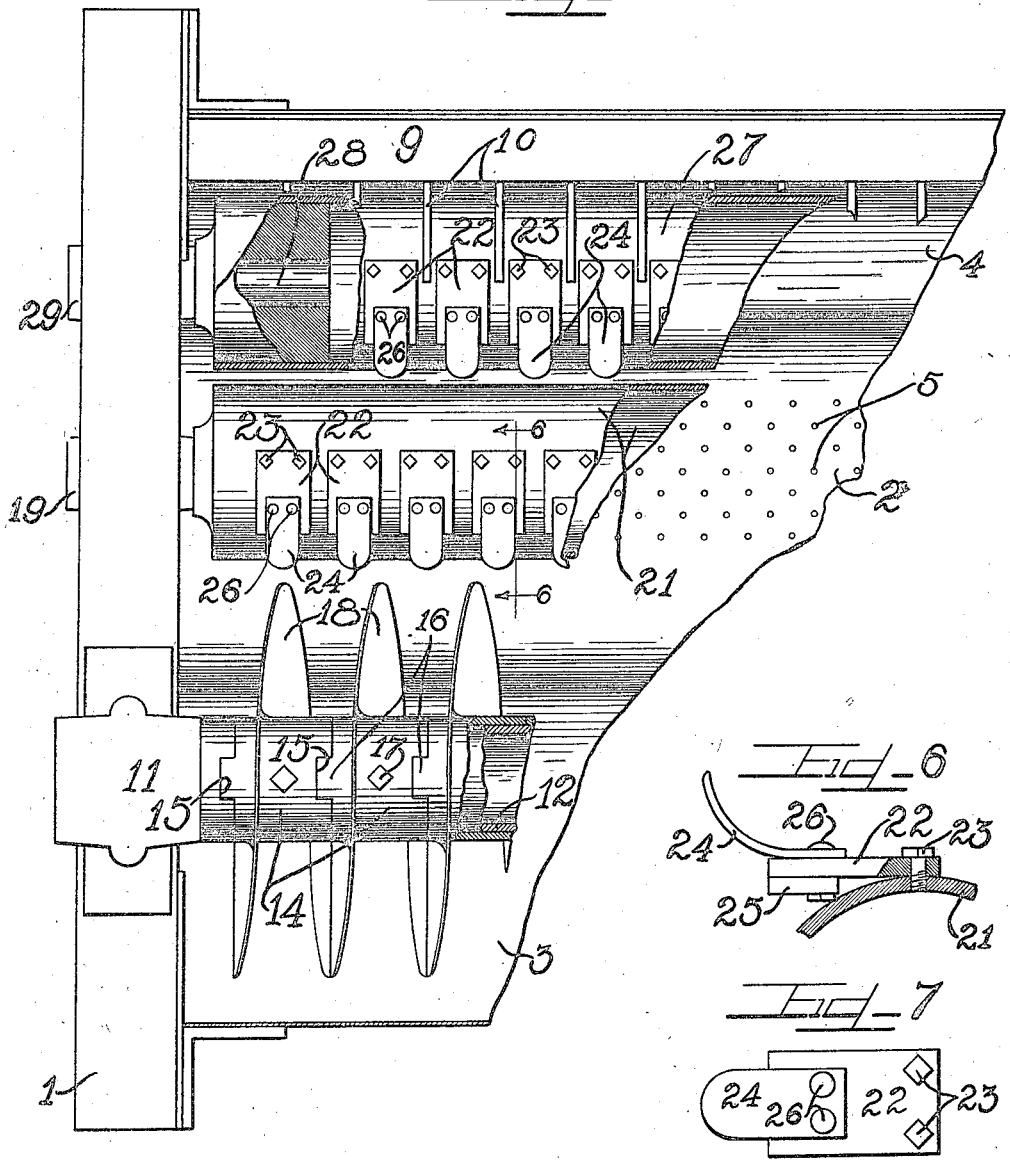

Patented Nov. 6, 1923.

1,473,299

UNITED STATES PATENT OFFICE.

JOHN W. KOHLHEPP, OF CHICAGO, ILLINOIS, ASSIGNOR TO THE ALLBRIGHT-NELL COMPANY, OF CHICAGO, ILLINOIS, A CORPORATION OF ILLINOIS.

HOG-DEHAIRING MACHINE.

Application filed July 28, 1922. Serial No. 578,032.

*To all whom it may concern:*

Be it known that I, JOHN W. KOHLHEPP, a citizen of the United States, and a resident of the city of Chicago, in the county of Cook and State of Illinois, have invented certain new and useful Improvements in a Hog-Dehairing Machine; and I do hereby declare that the following is a full, clear, and exact description of the same, reference being had to the accompanying drawings, and to the numerals of reference marked thereon, which form a part of this specification.

This invention relates more particularly to an improved hog dehairing machine wherein beaters mounted on rotating drums are adapted to rotate and dehair carcasses as said carcasses are positively fed longitudinally through the machine by means of a long, deep spiral which also acts to convey the hair removed from the carcasses through the machine.

It is an object of this invention to provide a machine equipped with a deep spiral adapted to feed hogs and the hair removed therefrom through the machine while the hogs are being acted upon by beater mechanisms.

It is also an object of the invention to provide a carcass cleaning machine wherein a carcass is conveyed along by a deep spiral over scraping drums disposed at different elevations.

It is a further object of the invention to provide a machine adapted to permit carcasses to be conveyed longitudinally through the machine in a trough afforded by longitudinally disposed rotating scraping drums and a spiral conveyor.

Another object of the invention is to provide a machine wherein dehairing mechanisms are adapted to deliver the removed hair into the path of operation of a spiral carcass feed mechanism which acts to discharge the hair from the machine.

It is furthermore an object of this invention to provide a carcass cleaning machine having a deep spiral adapted to convey carcesses and the hair removed therefrom through the machine at the same time.

A further object of the invention is to provide a carcass cleaning machine provided with guards for maintaining carcasses in the field of operations of beaters as the carcasses are fed through the machine by a spiral deep enough to receive the various extending members of the carcasses to insure positive feeding of the carcasses through the machine.

It is an important object of this invention to provide a carcass cleaning machine of simple and effective construction wherein hogs are positively conveyed longitudinally through the machine over parallel beaters disposed at different levels.

Other and further important objects of this invention will be apparent from the disclosures in the drawings and specification.

The invention (in a preferred form) is illustrated on the drawings and hereinafter more fully described.

On the drawings:

Figure 5 is an enlarged fragmentary detail section taken on line 5—5 of Figure 4 with parts broken away.

Figure 6 is an enlarged detail view of one of the beater mechanisms taken on line 6—6 of Figure 5, showing parts in section.

Figure 7 is a top plan view of a beater mechanism.

As shown on the drawings:

Figure 1:
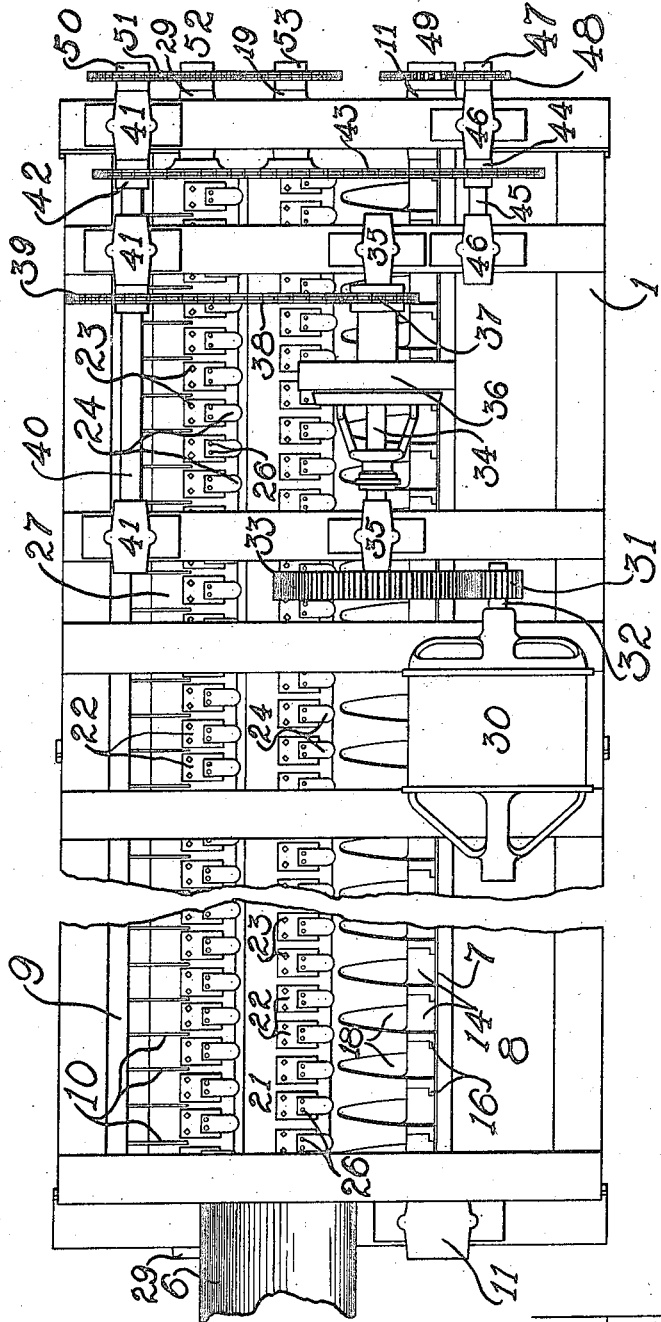
Figure 1 is a top plan view partly broken away of a hog dehairing machine embodying the principles of this invention.
Figure 2:
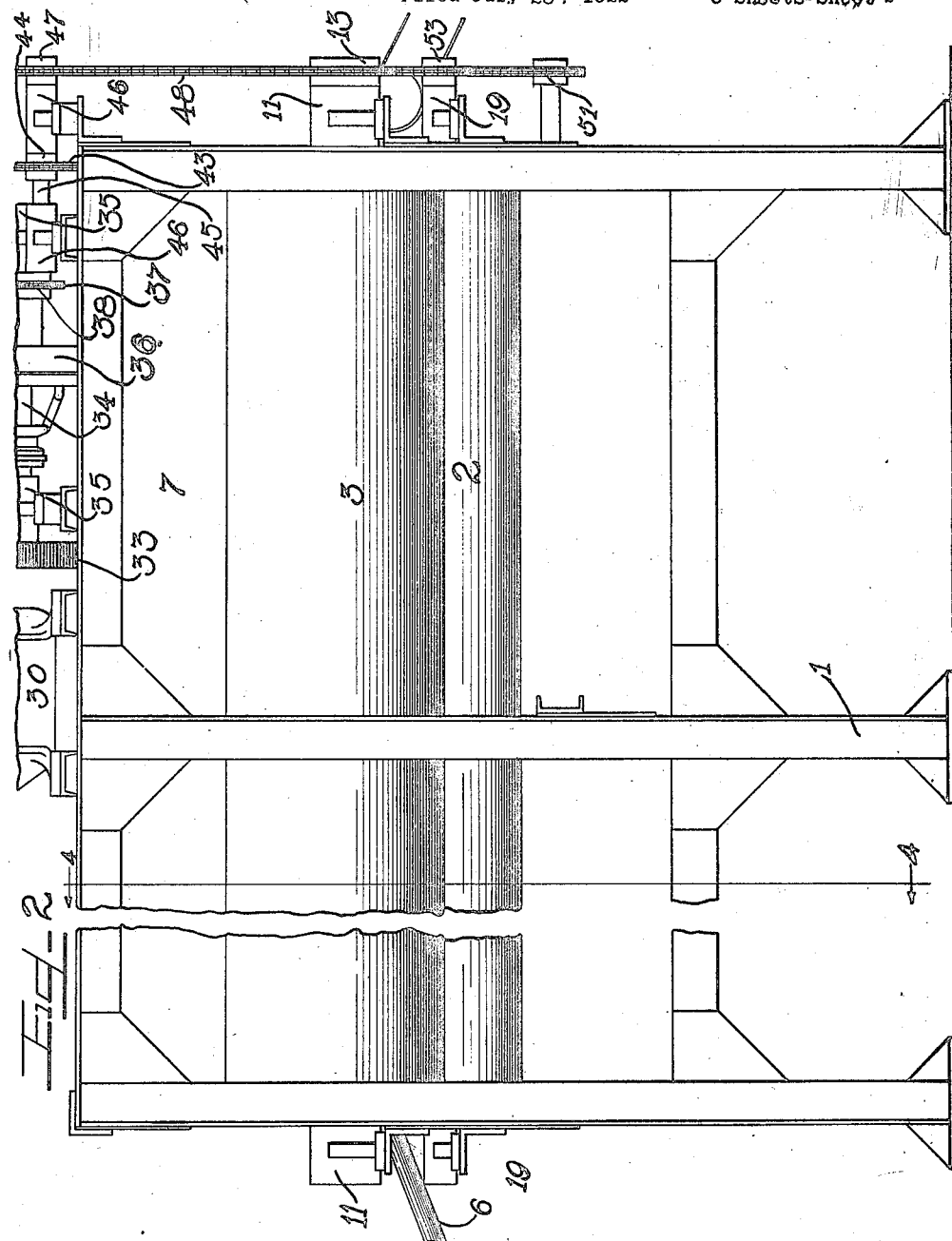
Figure 2 is a side elevation thereof.

The hog dehairing machine comprises a long metal framework 1 to which is secured an apron or tank embracing a lower curved middle section 2 integrally connecting curved side sections 3 and 4. The middle section 2 is provided with a plurality of drain apertures 5. The tank extends the full length of the machine frame. Secured to the discharge end of the machine 1 is a hog discharge trough or chute 6. Rigidly mounted longitudinally of the upper front corner of the machine frame above the tank section 3 is a vertical guard plate 7 braced by a horizontal plate 8. Securely mounted on the inner side of the rear side of the machine frame 1 above the tank section 4 is an angle iron 9 to which a plurality of spaced downwardly inclined guard arms 10 are secured.

Figure 4:
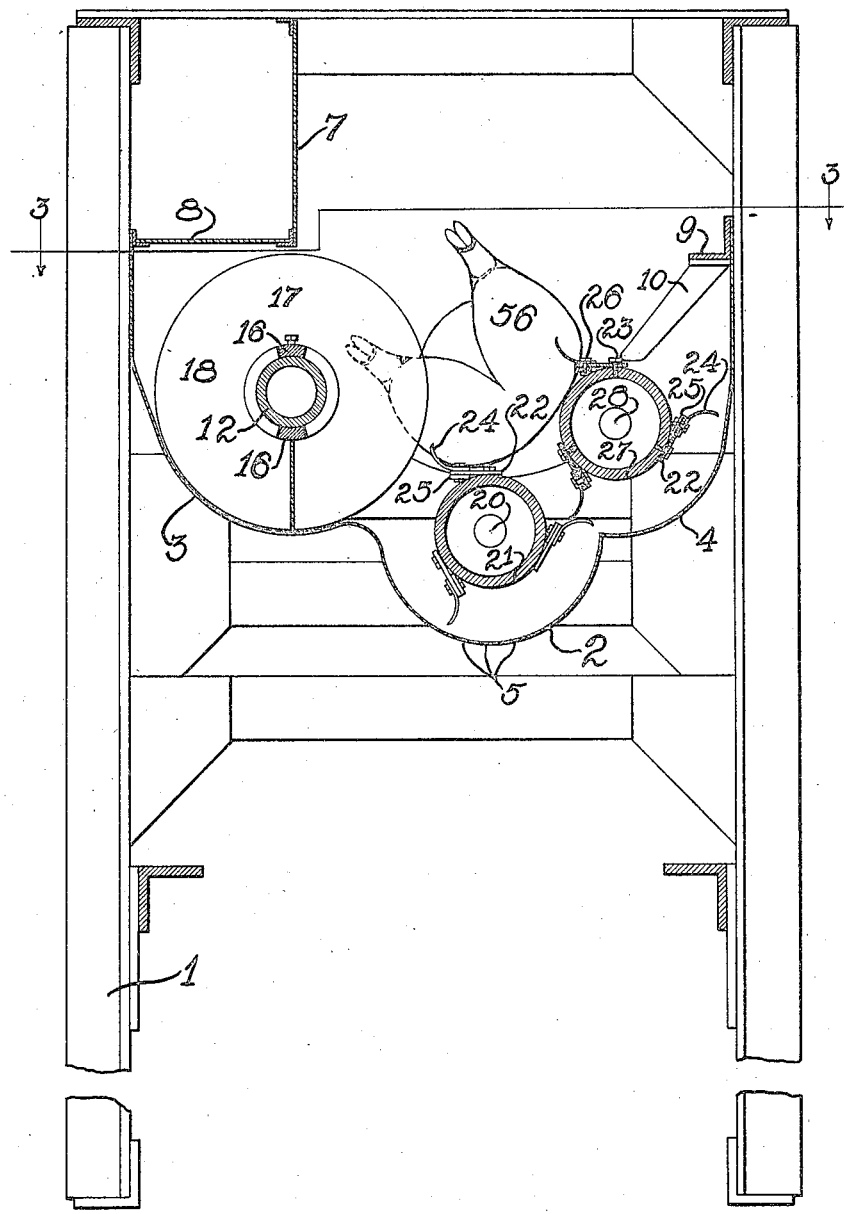
Figure 4 is a transverse sectional view taken on line 4—4 of Figure 2.

Journalled in bearings 11 mounted on the ends of the machine frame is a hollow or pipe shaft 12 having secured on one projecting end thereof at the intake end of the machine a sprocket wheel or gear 13. Secured on the pipe shaft 12 between the bearings 11 are a plurality of adjacently disposed abutting collars 14 each provided with notches 15 for receiving tenons or lugs 16 of an adjacent collar. The collars are secured in place by means of set screws 17. Each collar 14 has integrally formed thereon a spiral disk section 18 so formed that adjacent spiral disk sections abut one another to form a continuous spiral feed which is deep from the periphery of the collars 14. The spiral feed is positioned in the tank section 3 below the guard plate 7 as illustrated in Figure 4.

Journalled in bearings 19 supported on the ends of the machine frame are horizontal stub shafts 20 which are secured in the ends of a lower metal beater drum 21. Secured to the peripheral surface of the lower beater drum 21 by means of screw bolts 23 are three longitudinal rows of flexible beater arms 22 made of multiple ply canvas or fabric or any other suitable material. Secured to the outer face of each beater arm 22 is an outwardly curved metal scraping or beater blade 24. The under side of each beater arm 22 has secured thereto a flexible cushioning block or pad 25. The beater blades 24 and the pads 25 are secured in place by means of rivets or bolts 26.

An upper beater drum 27 is provided above the tank section 4 and is supported in place by end stub shafts 28 which are journalled in bearings 29 mounted on the end sections of the machine frame. Three longitudinal rows of beater mechanisms similar to those disclosed in Figures 6 and 7 are mounted upon the peripheral surface of the beater drum 27.

A motor 30 is mounted upon the top of the machine frame 1 and has a pinion 31 fixed on the projecting end of the shaft 32 thereof. The driving pinion 31 is in mesh with a large gear 33 which is secured on one end of a main shaft 34. The shaft 34 is journalled in bearings 35 supported on the top of the machine frame and is provided with a starting clutch mechanism 36 of any desired construction. Fixed on the shaft 34 to the outside of the clutch 36 is a sprocket wheel or gear 37 around which an endless driving chain 38 is trained. The chain 38 is also engaged around a sprocket wheel or gear 39 fixed on an auxiliary shaft 40. The shaft 40 is journalled in bearings 41 mounted on the top of the machine frame.

Also secured on the auxiliary driving shaft 40 between the two outermost bearings 41 is a sprocket wheel or gear 42 around which a chain 43 is trained. The chain 43 is also trained around a sprocket wheel or gear 44 supported on a shaft 45 journalled in bearings 46, which are mounted upon the top of the machine frame. A sprocket wheel or gear 47 is fixed on the outer end of the shaft 45 and has engaged therearound a chain 48. The chain 48 is trained around the sprocket wheel 13 and is held taut by means of an idler sprocket wheel or gear 49 supported on the machine frame. A drive from the motor 30 is thus transmitted to the spiral feed 18.

Figure 3:
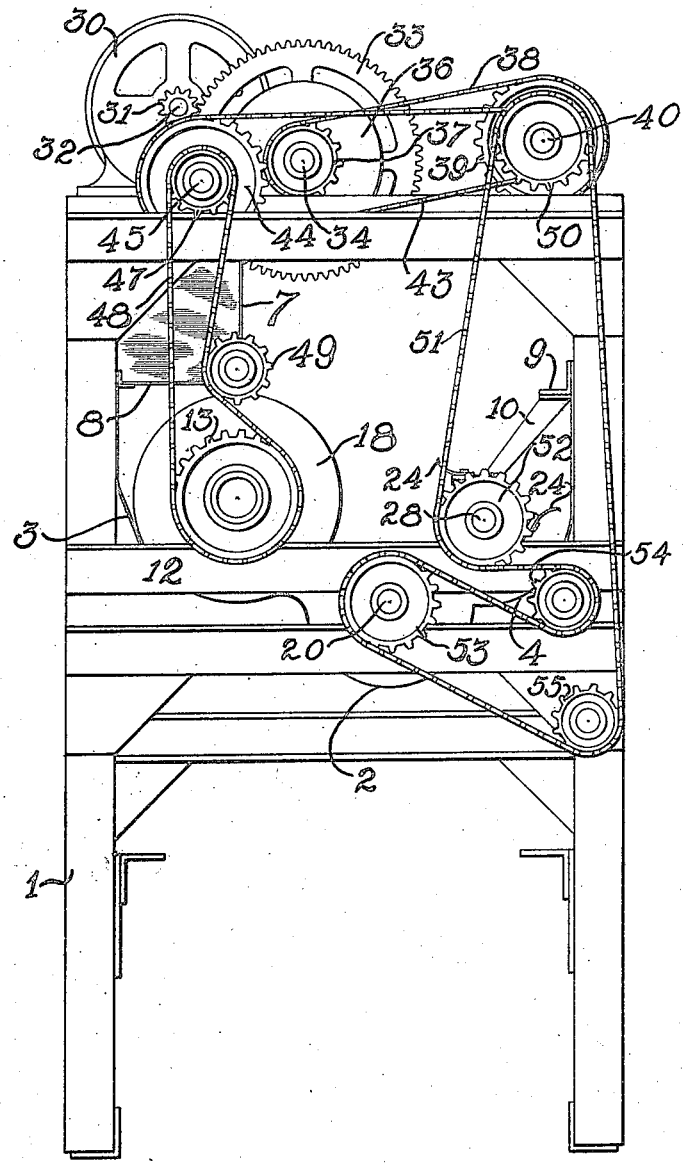
Figure 3 is an elevation of the intake end of the machine.

A sprocket wheel or gear 50 is fixed on the outer end of the auxiliary driving shaft 40 and has trained therearound an endless chain 51 which also engages a sprocket wheel 52 on the end of the beater drum shaft 28, and a sprocket wheel 53 on the end of the lower beater drum shaft 20. The chain 51 also engages small idler sprocket wheels 54 and 55 which are rotatably supported on the machine frame as illustrated in Figure 3.

As shown in Figure 4, a carcass to be cleaned is indicated by the reference numeral 56.

The operation is as follows:

A carcass to be cleaned after being properly scalded in a scalding vat, not shown, is delivered by means of a conveyor or other suitable means longitudinally and head first into the intake end of the dehairing machine above the lower beater drum 21 and between the upper beater drum 27 and the spiral feed mechanism 18. As shown in Figure 4, the carcass is thus fed into the field of operation of both of the beater drum mechanisms and the spiral feed mechanism.

By starting the motor 30 and throwing the clutch 36, the machine is operated through the various driving shafts and chains illustrated in Figures 1 and 3. The sprocket wheels and chains are so arranged that the beater drums and the spiral feed are all rotated in a clockwise direction looking at Figure 3, with the beater drums rotating five revolutions to each revolution of the spiral feed.

A carcass fed into the machine head first comes into engagement with the spiral feed 18 which acts to advance the carcass longitudinally through the machine while said carcass is simultaneously acted upon by both the lower and upper beater drums, the beater mechanisms of which act on the carcass to rotate, massage and scrape the same to clean and dehair all portions of the carcass as it is advanced toward the discharge end of the machine where it is delivered into the discharge chute 6.

Attention is called to the spiral feed mechanism in which the spiral members 18 are particularly deep for the purpose of permitting the head and legs of the carcass to project between the spiral members while the carcass is being rotated so that the carcass is positively advanced while being massaged and cleaned by beater drum mechanisms. Both of the beater drum mechanisms rotate in the same direction and are so set that the beater mechanisms mounted thereon will not interfere with one another to cause pinching or injury to the carcass while being advanced and cleaned.

The guards 10 and 7 are provided to prevent a rotating carcass from moving out of the field of operation of the beater drum mechanisms and the spiral feed into a position back of the spiral feed or in back of the upper beater drum mechanism.

While the carcass is being advanced through the machine and cleaned, water may be sprayed upon the carcass by any suitable arrangement to wash the dirt and hair off of the carcass. The removed hair and water is delivered by the rotating beater drum mechanisms into the lower tank section 2 where the water drains off through the outlet apertures 5 while the removed hair is delivered into the field of operation of the spiral feed which acts to advance the same through the machine and discharge the removed hair into a suitable receptacle placed at the discharge end of the machine.

A plurality of carcasses may be advanced and cleaned at the same time without interfering with one another.

I am aware that numerous details of construction may be varied through a wide range without departing from the principles of this invention, and I therefore do not purpose limiting the patent granted, otherwise than necessitated by the prior art.

I claim as my invention:

1. A carcass dehairing machine comprising parallel carcass supporting beater mechanisms disposed at different elevations, a deep spiral feed disposed parallel to the beater mechanisms, and mechanisms for rotating said beater mechanisms and said spiral feed in the same direction to cause rotation and cleaning of a carcass by the beater mechanisms as the spiral feed advances the carcass through the machine.

2. A carcass cleaning machine comprising a framework, scraping drums rotatably mounted thereon at different elevations to rotate and clean a carcass, a deep spiral feed rotatably mounted on the framework adjacent the scraping drums adapted to positively feed the carcass through the machine, means for driving the scraping drums and said spiral feed, and guards mounted on the framework for holding the carcass in the field of operation of said scraping drums and said spiral feed.

3. A carcass dehairing machine comprising drums extending the length of the machine, scraping devices thereon, a deep spiral feed device extending through the entire length of the machine, said drums together with the spiral feed affording a path for carcasses to be cleaned, and means for rotating said drums and said spiral feed at different rates of speed.

4. The combination with a pair of rotatable scraper drums disposed one above the other adapted to support a carcass while cleaning the same, and a deep spiral feed rotatably disposed to one side and opposite the uppermost scraper drum to engage and feed the carcass along the field of operation of said scraper drums.

5. In a carcass dehairing machine, the combination with a rotatable deep spiral feed adapted to advance a carcass through the machine, of rotatable scraper mechanisms disposed at different elevations to one side and below the level of said spiral feed adapted to rotate and clean the carcass and deliver the removed hair to said spiral feed to be discharged thereby.

6. The combination with a pair of scraper drums disposed one above the other adapted to support and rotate a carcass while cleaning the same, a spiral feed for advancing the carcass along said scraper drums, and guards for retaining the carcass in the field of operation of said scraper drums and said spiral feed.

In testimony whereof I have hereunto subscribed my name in the presence of two subscribing witnesses.

JOHN W. KOHLHEPP.

Witnesses:
CHARLES W. HILLS, Jr.,
OSCAR HARTMANN.